United States Patent
Krebs

(10) Patent No.: US 9,493,122 B2
(45) Date of Patent: Nov. 15, 2016

(54) REAR-VIEW MIRROR ASSEMBLY FOR MOTOR VEHICLES

(71) Applicant: Magna Mirrors Holding GmbH, Sailauf (DE)

(72) Inventor: Peter Krebs, Mömbris (DE)

(73) Assignee: MAGNA Mirrors Holding GmbH, Sailauf (DE)

( * ) Notice: Subject to any disclaimer, the term of this patent is extended or adjusted under 35 U.S.C. 154(b) by 0 days.

(21) Appl. No.: 14/771,758

(22) PCT Filed: Jan. 27, 2014

(86) PCT No.: PCT/DE2014/200028
§ 371 (c)(1),
(2) Date: Aug. 31, 2015

(87) PCT Pub. No.: WO2014/131406
PCT Pub. Date: Sep. 4, 2014

(65) Prior Publication Data
US 2016/0023606 A1   Jan. 28, 2016

(30) Foreign Application Priority Data
Mar. 1, 2013   (DE) .................. 10 2013 203 530

(51) Int. Cl.
| | | |
|---|---|---|
| G02F 1/1333 | (2006.01) | |
| B60R 1/06 | (2006.01) | |
| B60R 1/08 | (2006.01) | |
| H05B 3/84 | (2006.01) | |
| G02F 1/1335 | (2006.01) | |

(52) U.S. Cl.
CPC ............. *B60R 1/0602* (2013.01); *B60R 1/088* (2013.01); *G02F 1/133382* (2013.01); *G02F 1/133553* (2013.01); *H05B 3/84* (2013.01); *H05B 3/845* (2013.01)

(58) Field of Classification Search
CPC ....... B60R 1/0602; B60R 1/088; H05B 3/84; H05B 3/845; G02F 1/133382; G02F 1/13355
See application file for complete search history.

(56) References Cited

U.S. PATENT DOCUMENTS

| | | | | |
|---|---|---|---|---|
| 4,584,461 A | * | 4/1986 | Teshima | H05B 3/84 219/202 |
| 4,638,835 A | | 1/1987 | Chuang | |
| 5,223,976 A | * | 6/1993 | Fujie | B60R 1/088 15/250.03 |
| 5,448,397 A | | 9/1995 | Tonar | |
| 2004/0240029 A1 | | 12/2004 | Tonazzi et al. | |

FOREIGN PATENT DOCUMENTS

| | | |
|---|---|---|
| DE | 4021926 A1 | 1/1991 |
| EP | 0496155 A2 | 7/1992 |

* cited by examiner

*Primary Examiner* — James Dudek
(74) *Attorney, Agent, or Firm* — Jordan IP Law, LLC; Todd A. Vaughn

(57) ABSTRACT

A rear-view mirror arrangement for a motor vehicle, having a mirror assembly held on a carrier plate. The mirror assembly includes a liquid-crystal cell to view following traffic, and which has a variable reflectance controllable via a control device. The mirror assembly has a transparent plate arranged on a front side thereof and a rear-side reflective coating adjacent to and pointing toward the carrier plate. The rear-view mirror arrangement is automatically dimmable and heatable, and includes an optical liquid-crystal cell to produce a permanently clear optical image for the vehicle occupant as a user. In order to provide a heatable effect, an areal heating element is arranged on the carrier plate to generate thermal radiation, and a housing gap is disposed between the carrier plate and the mirror assembly such that the thermal radiation is to transmitted to a radiation-absorbing coating arranged on a reflective coating of the mirror assembly.

19 Claims, 2 Drawing Sheets

REAR-VIEW MIRROR ASSEMBLY FOR MOTOR VEHICLES

CROSS-REFERENCE TO RELATED APPLICATIONS

The present application is a National Stage Application of PCT International Application No. PCT/DE2014/200028 (filed on Jan. 27, 2014), under 35 U.S.C. §371, which claims priority to German Patent Application No. DE 10 2013 203 530.6 (filed on Mar. 1, 2013), which are each hereby incorporated by reference in their respective entireties.

TECHNICAL FIELD

The present invention relates to a rear-view mirror arrangement for motor vehicles.

BACKGROUND

Rear-view mirror arrangements for motor vehicles have a reflective surface which affords a view of the following traffic. Commonly, rear-view mirror arrangements are additionally designed to be dimmable. In this way, during travel in darkness, glare from vehicles travelling behind is prevented. In the case of automatically dimmable rear-view mirror arrangements, light sensors measure or detect the difference in brightness between the area in front of the vehicle and the traffic area behind. The measurement values are then transmitted to evaluation and control electronics, and the reflective capability of the mirror arrangement is correspondingly changed. In this case, mirror assemblies are used which comprise optical cells. Said optical cells may for example be in the form of liquid-crystal cells. In the case of such mirror arrangements, the reflective capability can be changed through the application of an electric field.

Furthermore, rear-view mirror arrangements for the exterior region are commonly designed to be heatable. In this way, an impairment of the view by water droplets, frost and ice, in particular in winter months, is prevented. Here, conventional mirror arrangements which are not equipped with an optical cell comprise a glass plate, a reflective coating, and an areal heating element arranged on the rear side of the reflective coating. Said areal heating element is commonly a carrier foil which comprises an electric heating resistor and which is adhesively bonded to the reflective coating. In this case, the areal heating element is arranged on a carrier plate which bears the mirror assembly. The heat generated by the resistance element is in this case conducted through the reflective coating to the outwardly pointing glass plate, in order, for example, to effect de-icing of the outer surface there.

For a mirror assembly which comprises a liquid-crystal cell, the known areal heating elements described in the introduction, and the arrangement thereof, are however unsuitable. Adhesive bonding between carrier plate, areal heating element, liquid-crystal cell and glass plate leads to distortion owing to the tolerances of the individual parts within the liquid-crystal cell. Said distortions lead to accumulations of liquid crystals of the liquid-crystal medium in the liquid-crystal cell, leading to noticeable dark blemishes in the optical image that is visible to the user.

A heatable mirror assembly which comprises an optical cell is known from U.S. Patent Publication No. 2004/0240029 A1. In the case of said already known mirror assembly, the optical cell is connected by way of a medium to a reflector. In one design variant, provision is made for the reflector to be in the form of a heater. A further design variant provides for a heatable air gap to be provided between the optical cell and reflector.

SUMMARY

It is therefore an object of the present invention to further develop an automatically dimmable, heatable rear-view mirror arrangement for a motor vehicle having an optical liquid-crystal cell such that the rear-view mirror arrangement permanently produces a clear optical image for the vehicle occupant as a user.

Said object is achieved by way of the features that include a rear-view mirror arrangement for motor vehicles, having a carrier plate and having a mirror assembly, which is held on the carrier plate and comprises a liquid-crystal cell, for viewing the following traffic, wherein the reflectance of the mirror assembly is designed to be variable by way of a control device, and wherein the mirror assembly has a glass plate arranged on a front side and has a rear-side reflective coating pointing toward the carrier plate, wherein the rear-view mirror arrangement is designed to be heatable, characterized in that, on the carrier plate, there is arranged an areal heating element which generates thermal radiation, and a housing gap remains between the carrier plate and the mirror assembly, and wherein the thermal radiation is transmitted to a radiation-absorbing coating arranged on the reflective coating of the mirror assembly.

The abovementioned disadvantages are eliminated by way of the rear-view mirror arrangement in accordance with embodiments, wherein, on the carrier plate, there is arranged an areal heating element which generates thermal radiation, and a housing gap remains between the carrier plate and the mirror assembly, and wherein the thermal radiation is transmitted to a radiation-absorbing coating arranged on the reflective coating of the mirror assembly. The mirror assembly with optical cell is not rigidly connected to the areal heating arrangement and to the carrier plate, whereby distortion is prevented.

Further advantageous embodiments and refinements of the rear-view mirror arrangement according to the invention will emerge from the subclaims.

DRAWINGS

Preferred embodiments of the rear-view mirror arrangement for a motor vehicle will be described by way of example below, wherein, for illustrative purposes, reference is made to the appended drawings, in which.

DESCRIPTION

Figure 1:
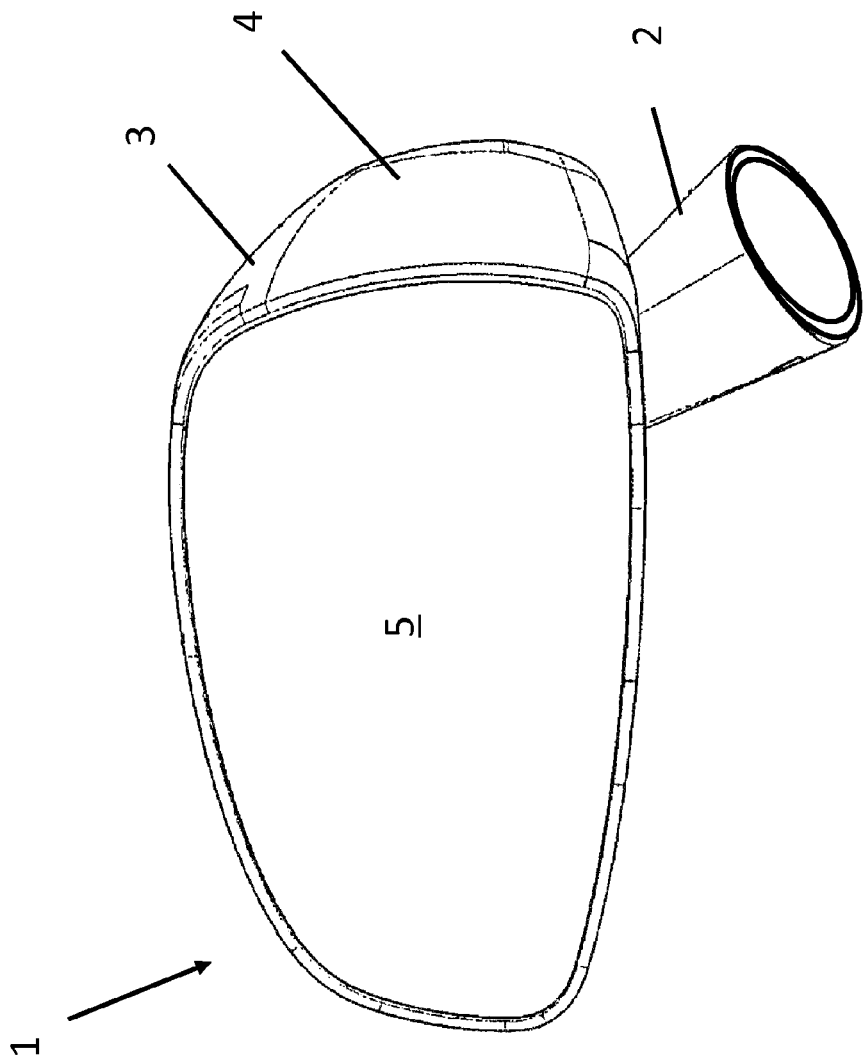
FIG. 1 shows a schematic view of a rear-view mirror arrangement in the form of an exterior mirror arrangement.

FIG. 1 shows a view of a rear-view mirror arrangement which is in the form of a vehicle exterior mirror 1 and which comprises a mirror foot 2 and a mirror head 3. The vehicle exterior mirror 1 is, in a known manner, fastened to the outside of the motor vehicle on the driver's or front passenger's side. The mirror head 3 is in this case arranged in foldable fashion on the mirror foot 2 and has a housing 4 composed of a thermoplastic plastics material. The housing 4 is formed in the shape of a half-shell and has a receiving space which, in a forward direction, has a receiving opening. In the receiving space there is inserted a mirror assembly 5, which is commonly mounted on an adjustable carrier plate 6 which is arranged in the receiving space of the mirror housing 4 and which is in the form of a housing element. Also provided is a light sensor by way of which the light intensity of the surroundings from the direction of the following traffic is detected. Furthermore, the light intensity of the area in front of the vehicle is detected. Actuation, and dimming, of the mirror assembly 5 is effected in a manner dependent on the measured signals.

Figure 2:
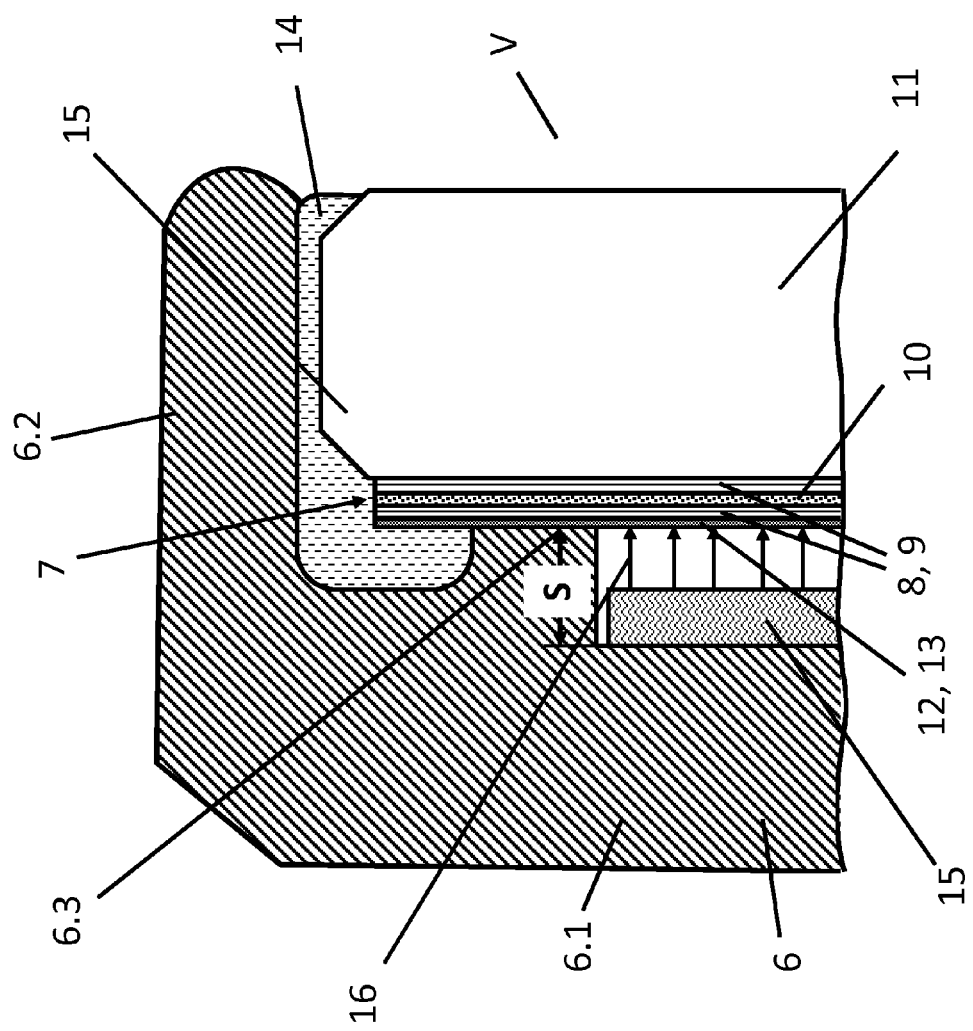
FIG. 2 shows a detail from a cross section of a mirror arrangement.

A detail from a cross section of the rear-view mirror arrangement 1 according to the invention, which is equipped with an automatic dimming function and which is designed to be heatable, will be described below on the basis of FIG. 2. The sensors for detecting the light intensity, the actuation electronics and evaluation electronics will not be illustrated or described in any more detail here. These are known to a person skilled in the art from the prior art.

For the change of the reflectance, the mirror assembly 5 according to the invention comprises a liquid-crystal cell 7. The latter has a transparent front-side carrier layer 8, a transparent rear-side carrier layer 9, and an electrically actuable liquid-crystal layer 10, which comprises a liquid-crystal medium, arranged between the carrier layers 8, 9. For electrical actuation, the liquid-crystal layer 10 is arranged between two transparent, electrically conductive layers. In the case of this liquid crystal-based technology, use is made of the effect that, when an electrical field is applied to the liquid-crystal cell 7, the liquid-crystal molecules align themselves parallel to the electrical field. In the basic state, that is to say without an electrical field, the liquid-crystal molecules are aligned in the longitudinal direction, that is to say the direction in which light passes through. To realize said alignment, alignment layers are additionally provided. Said alignment layers are arranged between the electrically conductive layers and the liquid-crystal layer 10.

The transparent carrier layers 8, 9 are for example in the form of foils. The transparent carrier layers may also be in the form of transparent plastics plates or glass plates. As viewed from the front side V of the rear-view mirror arrangement 1, a further transparent layer 11 is arranged on the transparent carrier layer 8. The layer 11 has the function of an anti-scratch protector and is in the form of a glass plate or plastics plate. The rear-side transparent carrier layer 9 is provided, on the side pointing toward the carrier plate 6, with a non-transparent, reflective layer 12. The non-transparent, reflective layer 12 is provided with a metallic coating. Said coating is produced for example by vapor deposition or sputtering or spraying. Furthermore, a radiation-absorbing coating 13 is applied to said reflective coating 12.

As already described in the introduction, the mirror assembly 5 is mounted on a carrier plate 6 in a housing 4. For this purpose, the carrier plate 6 has a carrier base plate 6.1 and an encircling carrier plate rim 6.2 with a face surface pointing toward the front side V. In this case, the carrier base plate 6.1 and carrier plate rim 6.2 form a receiving space, which is open in a forward direction, for the mirror assembly 5. The carrier base plate 6.1 is formed with bearing points 6.3 for supporting the mirror assembly 5. Said bearing points 6.3 are for example in the form of web-like bearing points. In this case, when the mirror assembly 5 is retained and supported on the carrier plate 6, a gap S remains between carrier plate base 6.1 and mirror assembly 5. Furthermore, an encircling housing gap remains between the carrier plate rim 6.2 and the mirror assembly 5, wherein, during the assembly of the rear-view mirror arrangement, there is fitted into said housing gap a seal 14 for the sealing retention of the mirror assembly 5 in the housing 4 or the carrier plate 6.

An areal heating element 15 is arranged on that surface of the carrier base plate 6.1 which points toward the mirror assembly 5. The areal heating element 15 is preferably adhesively bonded to the carrier base plate 6.1. As can be seen from the drawing, said areal heating element 15 is arranged spaced apart from the mirror assembly 5. The thermal radiation generated by the areal heating element 15 is in this case transmitted to the radiation-absorbing coating (thermal radiation indicated by the arrows 16). From the radiation-absorbing coating 13, the heat is transported to the front-side glass plate 11 by heat conduction.

What is claimed is:

1. A rear-view mirror arrangement for a motor vehicle, comprising:
   a carrier plate;
   a mirror assembly including a liquid-crystal cell, a transparent layer arranged on a front side thereof, a rear-side reflective layer, and a radiation-absorbing coating on the rear-side reflective layer;
   a housing gap between the carrier plate and the mirror assembly; and
   an areal heating element to generate thermal radiation which is transmitted through the housing gap to the radiation-absorbing coating, thereby heating the mirror assembly.

2. The rear-view mirror arrangement of claim 1, wherein the carrier plate comprises a carrier base plate and a carrier plate rim.

3. The rear-view mirror arrangement of claim 2, wherein the carrier base plate has bearing points to support the mirror assembly in a spaced apart arrangement with respect to the carrier base plate.

4. The rear-view mirror arrangement of claim 2, further comprising:
   a second housing gap between the carrier plate rim and the mirror assembly; and
   a seal which completely closes off and seals the second housing gap.

5. The rear-view mirror arrangement of claim 1, wherein the areal heating element is attached to the carrier base plate.

6. The rear-view mirror arrangement of claim 1, wherein the areal heating element is adhesively bonded to the carrier base plate.

7. The rear-view mirror arrangement of claim 1, wherein the transparent layer comprises a glass or plastic.

8. A rear-view mirror arrangement for a motor vehicle, comprising:
   a carrier plate;
   a mirror assembly having a first transparent layer, and a liquid-crystal cell with a multi-layered structure that includes a transparent front-side carrier layer, a transparent rear-side carrier layer, an electrically actuable liquid-crystal layer arranged between the transparent front-side carrier layer and the transparent rear-side carrier layer, a non-transparent, reflective layer, and a radiation-absorbing coating on the non-transparent, reflective layer;
   a housing gap between the carrier plate and the mirror assembly; and
   an areal heating element to generate thermal radiation which is transmitted through the housing gap to the radiation-absorbing coating, thereby heating the mirror assembly.

9. The rear-view mirror arrangement of claim 8, wherein the carrier plate comprises a carrier base plate and a carrier plate rim.

10. The rear-view mirror arrangement of claim 9, wherein the carrier base plate has bearing points to support the mirror assembly in a spaced apart arrangement with respect to the carrier base plate.

11. The rear-view mirror arrangement of claim 9, further comprising:
   a second housing gap between the carrier plate rim and the mirror assembly; and
   a seal which completely closes off and seals the second housing gap.

12. The rear-view mirror arrangement of claim 8, wherein the areal heating element is attached to the carrier base plate.

13. The rear-view mirror arrangement of claim 8, wherein the areal heating element is adhesively bonded to the carrier base plate.

14. A rear-view mirror arrangement for a motor vehicle, comprising:
   a carrier plate;
   a mirror assembly having:
      a first layer composed of a transparent material, and
      a liquid-crystal cell with a multi-layered structure that includes a second layer composed of a transparent material arranged behind the first transparent layer, a third layer comprising an electrically actuable liquid-crystal, arranged behind the second transparent layer, a fourth layer composed of a transparent material arranged behind the third layer, a fifth layer composed of a non-transparent, reflective material, and a radiation-absorbing coating on the fifth layer;
   a housing gap between the carrier plate and the mirror assembly; and
   an areal heating element to generate thermal radiation which is transmitted through the housing gap to the radiation-absorbing coating, thereby heating the mirror assembly.

15. The rear-view mirror arrangement of claim 14, wherein the carrier plate comprises a carrier base plate and a carrier plate rim.

16. The rear-view mirror arrangement of claim 15, wherein the carrier base plate has bearing points to support the mirror assembly in a spaced apart arrangement with respect to the carrier base plate.

17. The rear-view mirror arrangement of claim 15, further comprising:
   a second housing gap between the carrier plate rim and the mirror assembly; and
   a seal which completely closes off and seals the second housing gap.

18. The rear-view mirror arrangement of claim 14, wherein the areal heating element is attached to the carrier base plate.

19. The rear-view mirror arrangement of claim 14, wherein the areal heating element is adhesively bonded to the carrier base plate.

* * * * *